(12) United States Patent
Ginty et al.

(10) Patent No.: US 11,907,534 B1
(45) Date of Patent: Feb. 20, 2024

(54) STORAGE DEVICE PROJECTED TEMPERATURE ENVIRONMENT CONFIGURATION SYSTEM

(71) Applicant: Dell Products L.P., Round Rock, TX (US)

(72) Inventors: Anthony Gerard Ginty, Cork (IE); Gregory Martin Allen, Layton, UT (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/900,209

(22) Filed: Aug. 31, 2022

(51) Int. Cl.
*G06F 12/00* (2006.01)
*G06F 12/02* (2006.01)
*G06F 3/06* (2006.01)

(52) U.S. Cl.
CPC .......... *G06F 3/0607* (2013.01); *G06F 3/0659* (2013.01); *G06F 3/0683* (2013.01)

(58) Field of Classification Search
CPC ...... G06F 1/206; G06F 1/3225; G06F 1/3275; G06F 11/3013; G06F 11/3034; G06F 11/3058; G06F 12/0246; G06F 2201/81; G06F 3/0619; G06F 3/0634; G06F 3/0653; G06F 3/0661; G06F 3/0679
See application file for complete search history.

(56) References Cited

U.S. PATENT DOCUMENTS

2015/0092488 A1 4/2015 Wakchaure et al.

*Primary Examiner* — Yong J Choe
(74) *Attorney, Agent, or Firm* — Joseph Mencher

(57) ABSTRACT

A storage device projected temperature environment configuration system includes storage devices with the same physical hardware configuration, and a computing device manufacturing system that manufactures computing devices. A storage device projected temperature environment configuration subsystem in the computing device manufacturing system identifies a first projected temperature environment for a first computing device being manufactured by the computing device manufacturing system, configures a first subset of the storage devices to perform first storage device operations in the first projected temperature environment, identifies a second projected temperature environment that is for a second computing device being manufactured by the computing device manufacturing system and that is different than the first projected temperature environment, and configures a second subset of the storage devices to perform second storage device operations in the second projected temperature environment that are different than the first storage device operations.

20 Claims, 13 Drawing Sheets

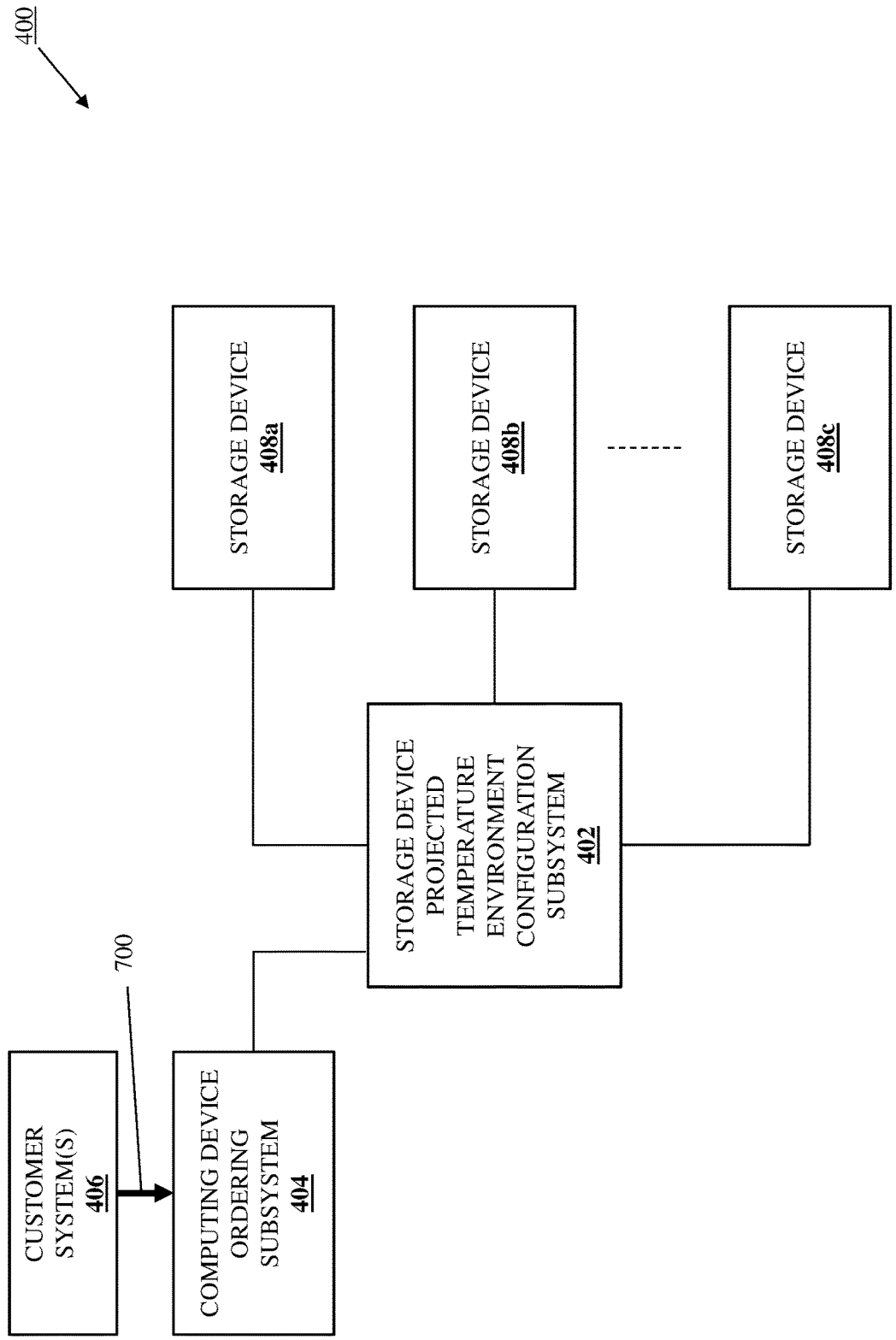

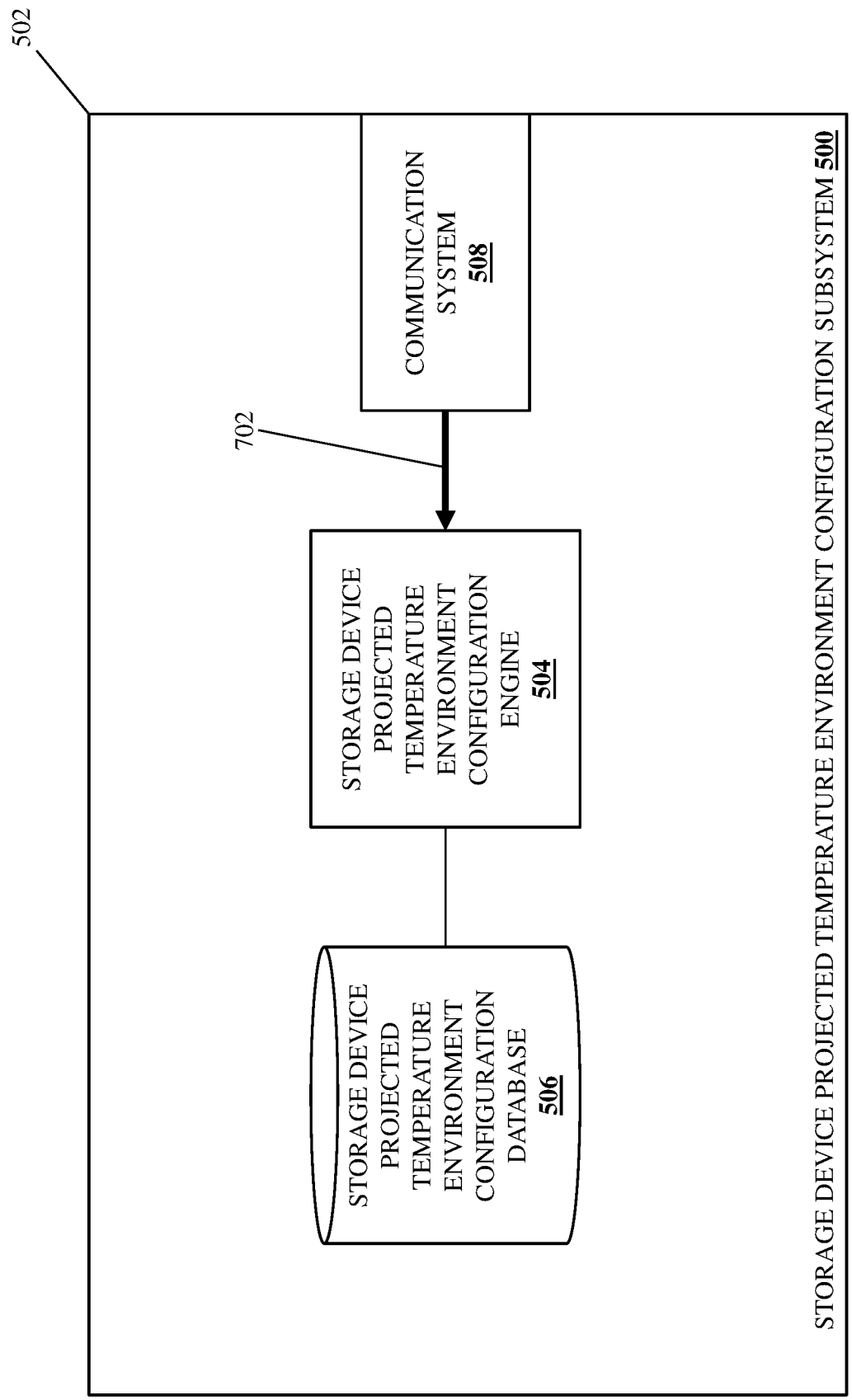

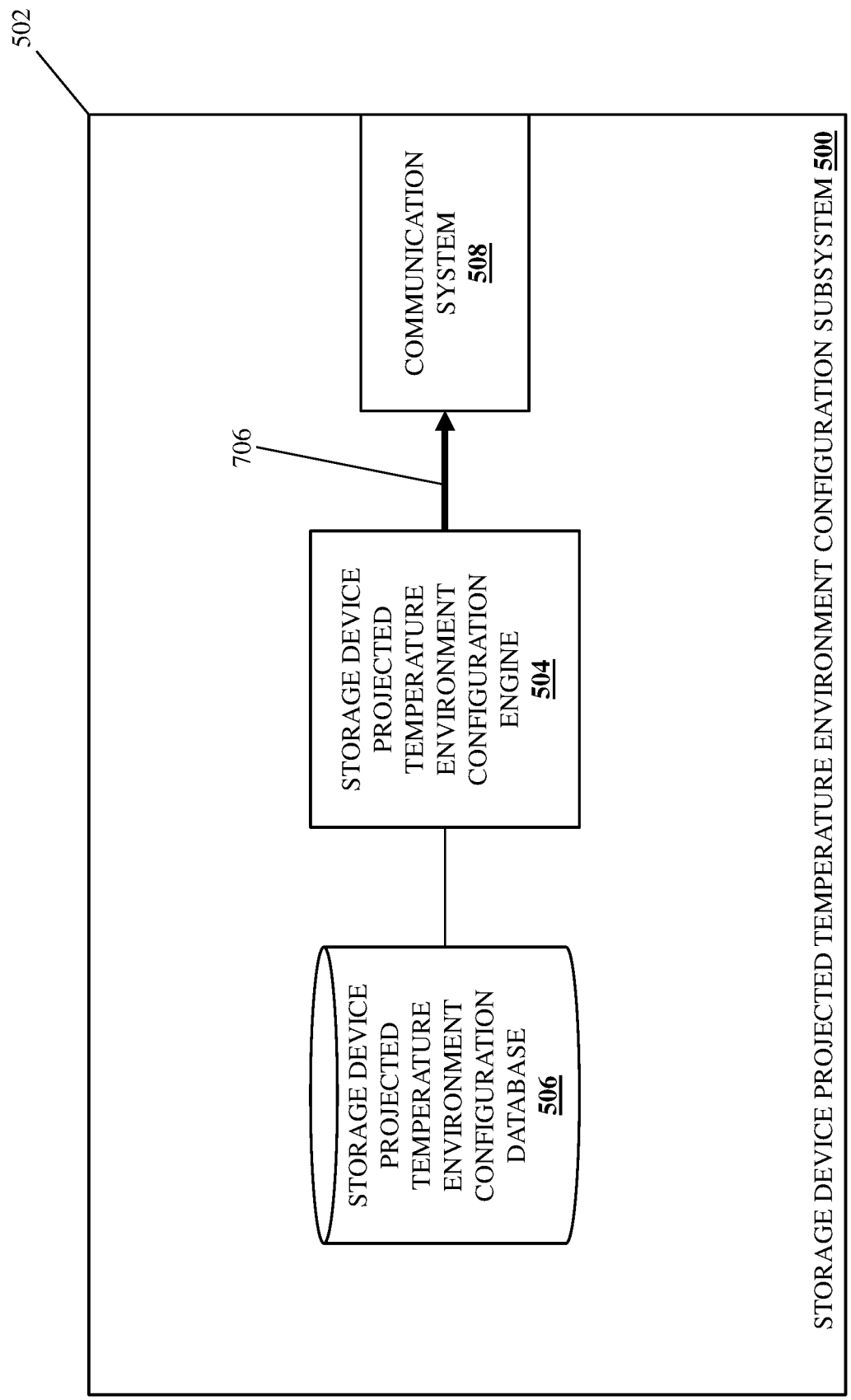

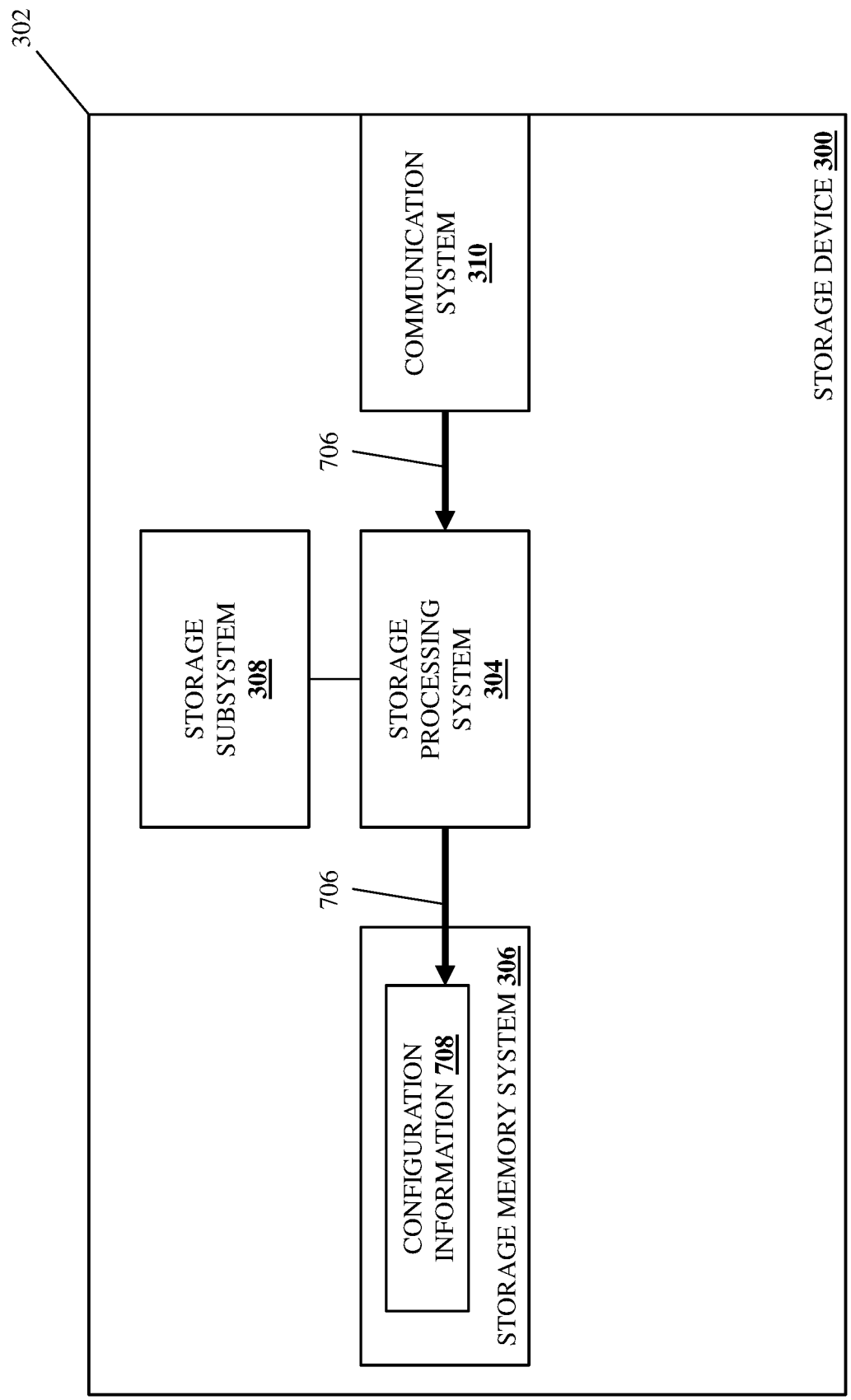

STORAGE DEVICE PROJECTED TEMPERATURE ENVIRONMENT CONFIGURATION SYSTEM

BACKGROUND

The present disclosure relates generally to information handling systems, and more particularly to configuring storage devices used in information handling systems based on their projected temperature environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, and/or other computing devices known in the art, utilize storage devices for the storage of their data. While computing devices are often utilized in temperature-controlled environments such as datacenters, computing devices are sometimes deployed in more extreme temperatures environments. For example, telecommunications ("telco") and other "edge" environments (referred to as "telco/edge environments" below) may utilize computing devices that may be subject to extreme ambient temperature ranges (e.g., ambient temperature ranges between 0° C.-55° C.) as compared to datacenter environments (e.g., which typically include an ambient temperature range between 10° C.-35° C.), which can raise issues with regard to the storage devices provided therein.

For example, storage devices such as Solid-State Drive (SSD) storage devices include NAND storage subsystems that can experience issues when utilized at extreme temperatures, and conventionally those SSD storage devices must be manufactured to operate at such extreme temperatures in order to address those issues. However, the manufacture of SSD storage devices to operate at extreme temperatures requires conventional computing device manufacturing systems that wish to provide computing devices for both datacenter environments and telco/edge environments to stock both datacenter storage devices provided by datacenter storage device manufacturers/suppliers, as well as telco/edge storage devices provided by telco/edge storage device manufacturers/suppliers, and one of skill in the art in possession of the present disclosure will appreciate that the datacenter storage device market and the telco/edge storage device market are separate and distinct markets with separate and distinct storage device manufacturers/suppliers. As such, computing device manufacturers that provide computing devices for both datacenter environments and telco/edge environments experience are subject to "computing device manufacturing storage device complexity" that stems from the need to manage different datacenter storage device manufacturers/suppliers and telco/edge storage device manufacturers/suppliers, different datacenter storage device inventories and telco/edge storage device inventories, and/or other computing device manufacturing storage device complexity issues that would be apparent to one of skill in the art in possession of the present disclosure.

One solution to avoiding the computing device manufacturing storage device complexity issues discussed above includes the computing device manufacturer system stocking only the datacenter storage devices discussed above, which reduces the need to manage the telco/edge storage device manufacturers/suppliers and telco/edge storage device inventories discussed above, but requires that the computing device manufacturer system modify the datacenter storage devices in their stock with cooling subsystems (e.g., heat spreaders, heat sinks, etc.) in order to allow those datacenter storage devices to operate properly in Telco/Edge environments, and significantly limits customer choices with regard to storage devices for utilization with computing devices ordered for telco/edge environments. For example, relatively low power/low-capacity M.2 storage devices may be stocked as the datacenter environment storage devices discussed above, and may be modified to provide telco/edge environment storage devices by providing a heat spreader on those M.2 storage devices, thus addressing the computing device manufacturing storage device complexity issues discussed above while greatly limiting the storage device choices for customers.

Accordingly, it would be desirable to provide for the provisioning of storage devices in computing devices utilized in either temperature controlled or extreme temperature environments while addressing the issues discussed above.

SUMMARY

According to one embodiment, an Information Handling System (IHS) includes a processing system; and a memory system that is coupled to the processing system and that includes instructions that, when executed by the processing system, cause the processing system to provide a storage device projected temperature environment configuration engine that is configured to: identify, in first computing device ordering information included in a computing device ordering subsystem, a first projected temperature environment for a first computing device being manufactured by a computing device manufacturing system; configure at least one first storage device that is included in a plurality of storage devices having the same physical hardware configuration to perform first storage device operations in the first projected temperature environment for the first computing device; identify, in second computing device ordering information included in the computing device ordering subsystem, a second projected temperature environment for a second computing device being manufactured by the computing device manufacturing system, wherein the second projected temperature environment is different than the first projected temperature environment; and configure at least one second storage device included in the plurality of storage devices to perform second storage device operations in the second projected temperature environment for the second computing device that are different than the first storage device operations.

BRIEF DESCRIPTION OF THE DRAWINGS

FIG. 7A is a schematic view illustrating an embodiment of the computing device manufacturing system of FIG. 4 operating during the method of FIG. 6.

FIG. 7C is a schematic view illustrating an embodiment of the storage device projected temperature environment configuration system of FIG. 5 operating during the method of FIG. 6.

FIG. 7E is a schematic view illustrating an embodiment of the storage device projected temperature environment configuration system of FIG. 5 operating during the method of FIG. 6.

FIG. 7G is a schematic view illustrating an embodiment of the storage device of FIG. 3 operating during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
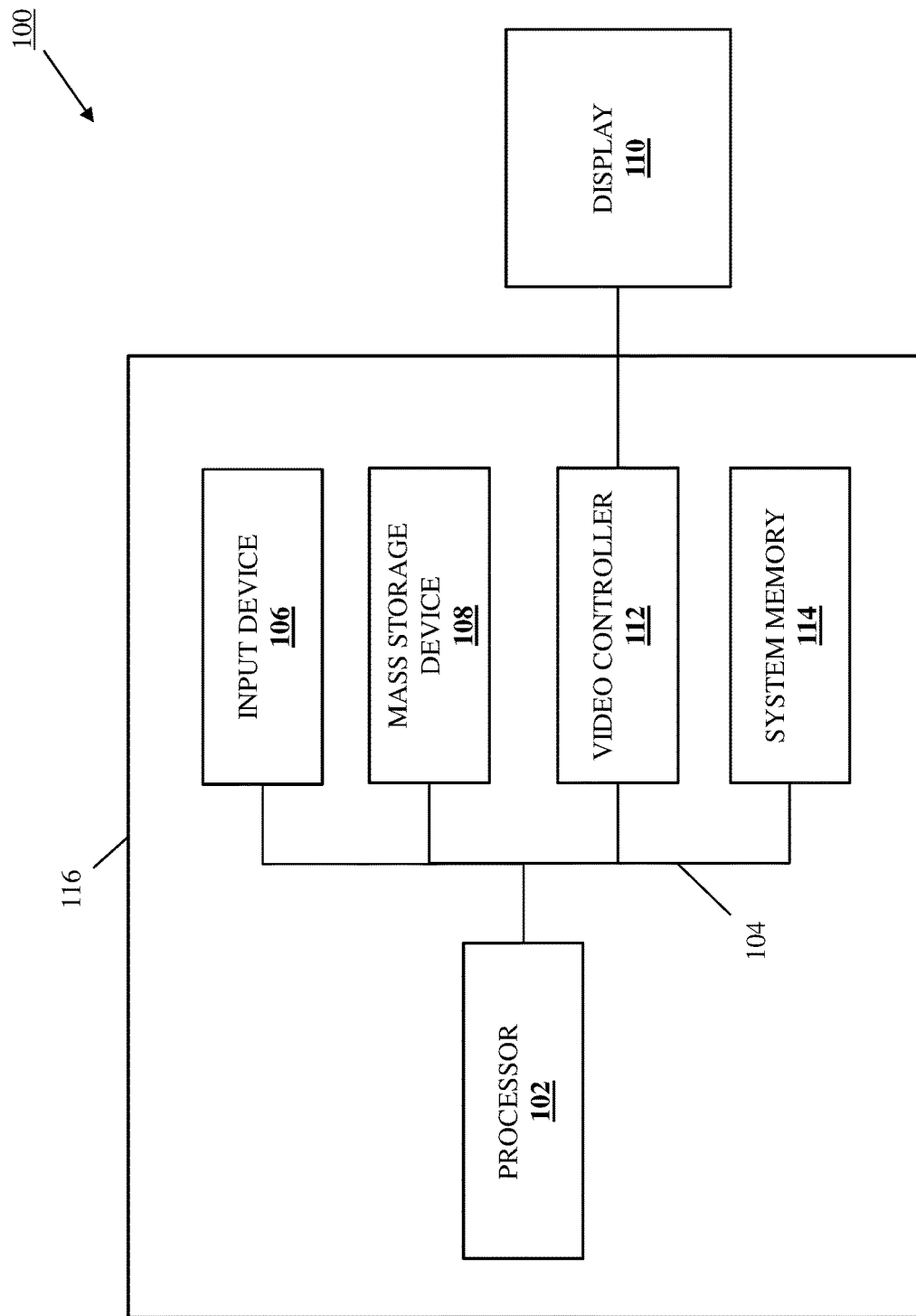
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
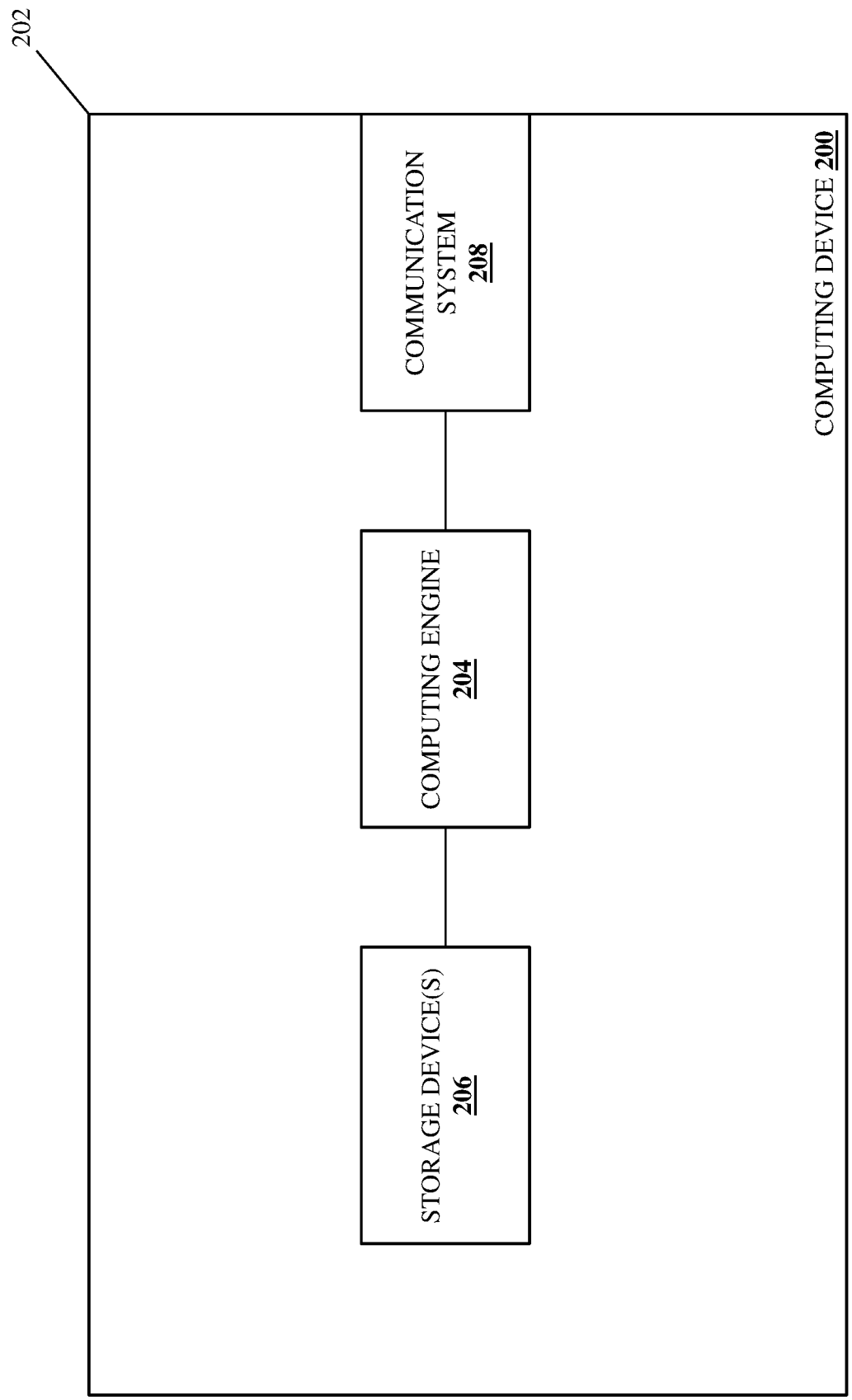
FIG. 2 is a schematic view illustrating an embodiment of a computing device that may include a storage device provided according to the teachings of the present disclosure.

Referring now to FIG. 2, an embodiment of a computing device 200 is illustrated that may include storage devices provided according to the teachings of the present disclosure. In an embodiment, the computing device 200 may be provided by the IHS 100 discussed above with reference to FIG. 1 and/or may include some or all of the components of the IHS 100, and in specific examples may be provided by server devices, storage systems, and/or other computing devices that one of skill in the art in possession of the present disclosure would recognize as utilizing storage(s) device provided according to the teachings of the present disclosure. However, while illustrated and discussed as being provided by particular computing devices, one of skill in the art in possession of the present disclosure will recognize that other devices may utilize the storage device provided according to the teachings of the present disclosure while remaining within its scope as well. In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing engine 204 that is configured to perform any of a variety of computing functionality that would be apparent to one of skill in the art in possession of the present disclosure.

The chassis 202 may also house one or more storage devices 206 that may be provided according to the teachings of the present disclosure and that may be coupled to the computing engine 204 (e.g., via a coupling between the storage device(s) 206 and the processing system). The chassis 202 may also house a communication system 208 that is coupled to the computing engine 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing device including storage devices provided according to the teachings of the present disclosure may include a variety of other components and/or component configurations while remaining within the scope of the present disclosure as well.

Figure 3:
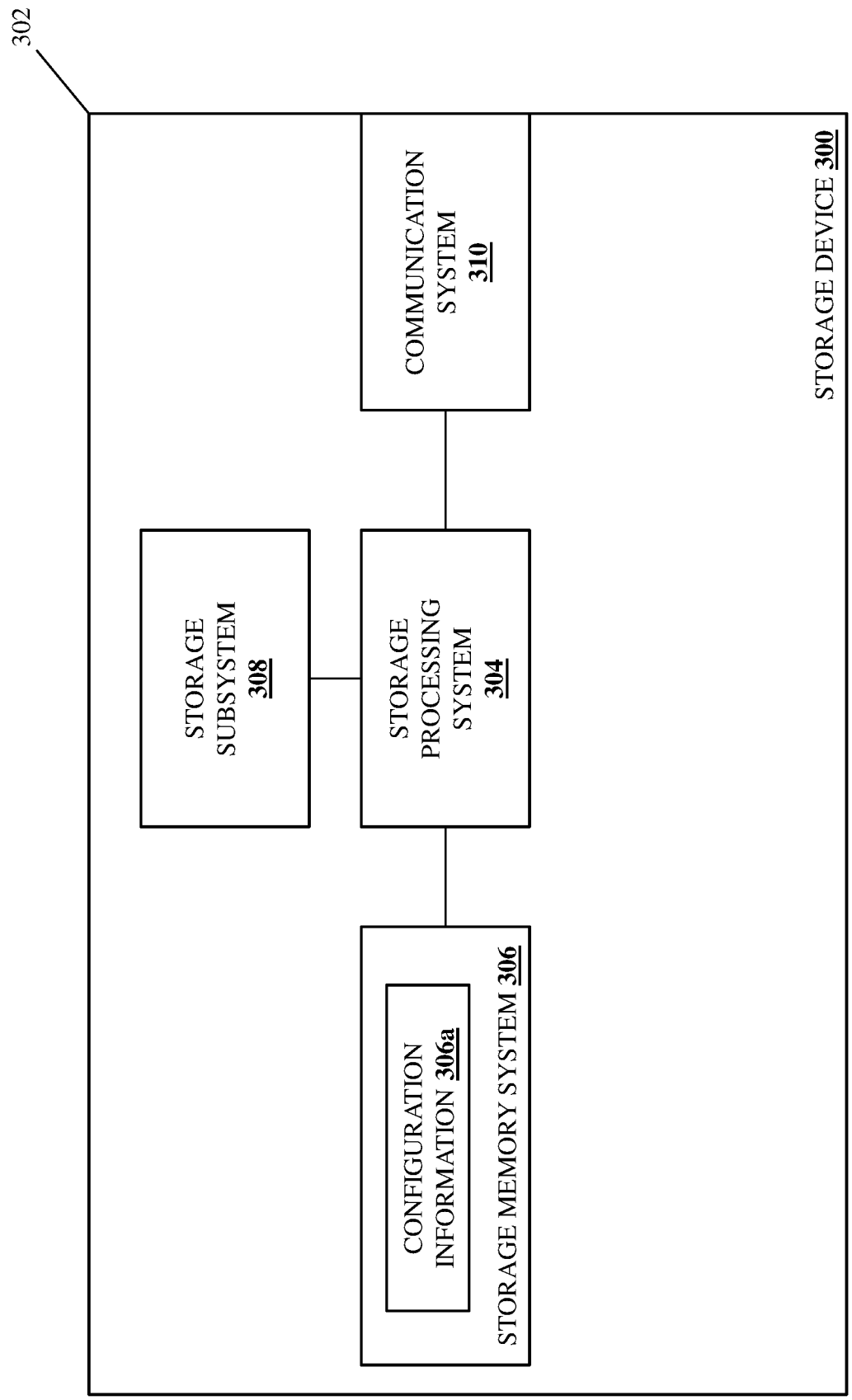
FIG. 3 is a schematic view illustrating an embodiment of a storage device that may be provided according to the teachings of the present disclosure.

Referring now to FIG. 3, an embodiment of a storage device 300 is illustrated that may be provided according to the teachings of the present disclosure. As such, the storage device 300 may be provided in the IHS 100 discussed above with reference to FIG. 1 (e.g., as the storage device 108), and in specific examples may be provided by an SSD storage device that utilizes a NAND storage subsystem. However, while illustrated and discussed as being provided by an SSD storage device that utilizes specific storage technology, one of skill in the art in possession of the present disclosure will recognize that the storage device 300 discussed below may be provided utilize other storage technologies while remaining within the scope of the present disclosure as well. In the illustrated embodiment, the storage device 300 includes a chassis 302 that houses the components of the storage device 300, only some of which are illustrated and discussed below. For example, the chassis 302 may house a storage processing system 304 and a storage memory system 306 that is coupled to the storage processing system 304 and that may include configuration information 306a that, when executed by the storage processing system 304, cause the storage processing system 304 to provide a storage engine that is configured to perform the storage operations and/or other functionality of the storage engines and/or storage devices discussed below. In the examples below, the configuration information 306a (or other configuration information stored in the storage memory system 306) and the storage processing system 304 operate to provide firmware that performs the storage operations discussed below, but one of skill in the art in possession of the present disclosure will appreciate how storage operations may be enabled for the storage device 300 in other manners that will fall within the scope of the present disclosure as well.

The chassis 302 may also house a storage subsystem 308 that is coupled to the storage processing system 304 and that, in a specific example, may be provided by a NAND storage subsystem. However, while described below as being provided by a NAND storage subsystem, one of skill in the art in possession of the present disclosure will appreciate how the storage subsystem 308 may be provided by other storage technologies while remaining within the scope of the present disclosure as well. The chassis 302 may also house a communication system 310 that is coupled to the storage processing system 304 and that may be provided by any of a variety of storage device communication components that would be apparent to one of skill in the art in possession of the present disclosure. However, while a specific storage device 300 has been illustrated and described, one of skill in the art in possession of the present disclosure will recognize that storage devices provided according to the teachings of the present disclosure may include a variety of components and/or component configurations for providing conventional storage device functionality, as well as any of the functionality discussed below, while remaining within the scope of the present disclosure as well.

Figure 4:
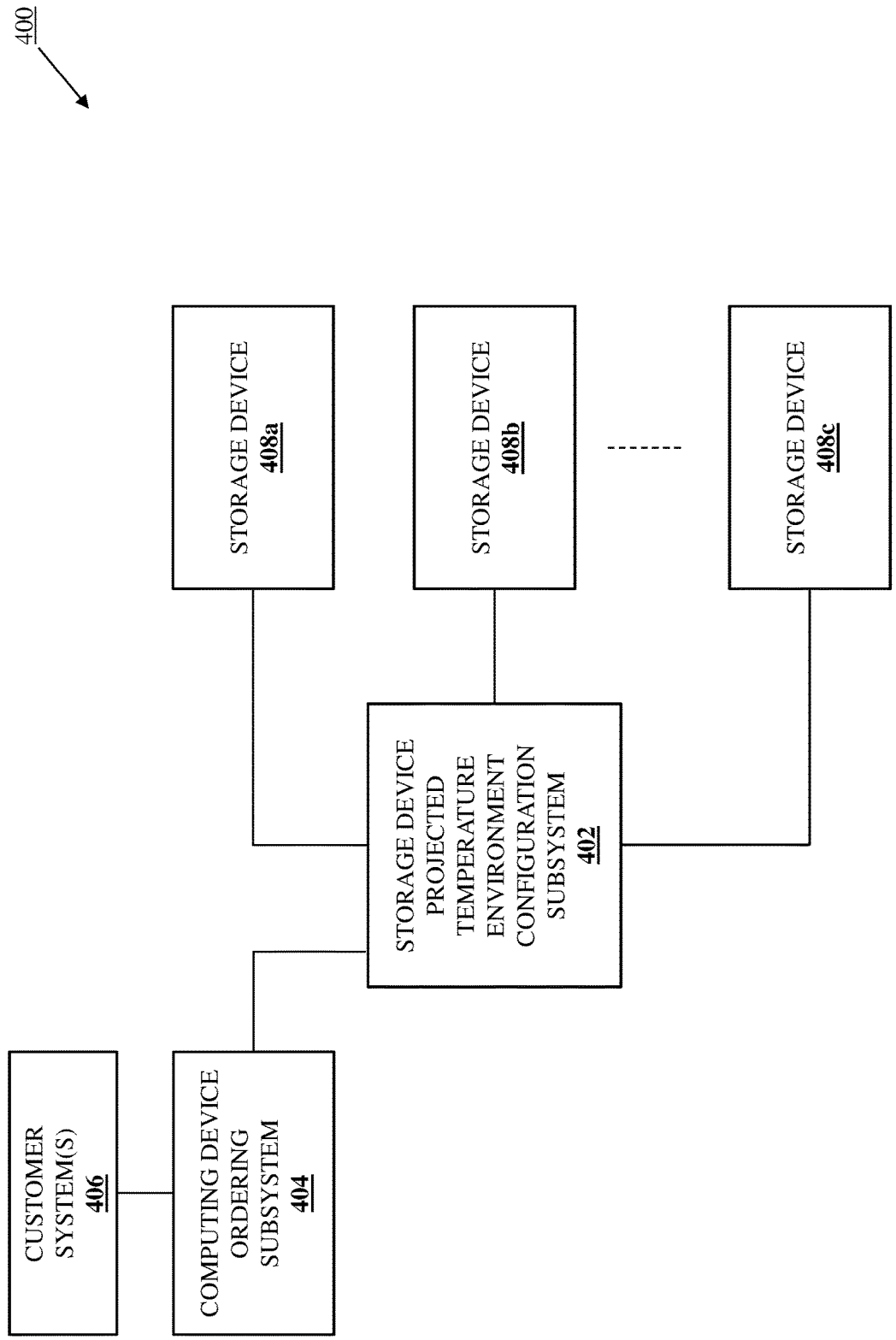
FIG. 4 is a schematic view illustrating an embodiment of a computing device manufacturing system that may provide storage devices according to the teachings of the present disclosure.

Referring now to FIG. 4, an embodiment of a computing device manufacturing system 400 is illustrated that may manufacture computing devices that include storage devices provided according to the teachings of the present disclosure. In the illustrated embodiment, the computing device manufacturing system 400 includes a storage device projected temperature environment configuration subsystem 402 that is configured to provide the storage devices of the present disclosure. In an embodiment, the storage device projected temperature environment configuration subsystem 402 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that storage device projected temperature environment configuration subsystem 402 provided in the computing device manufacturing system 400 may include any devices that may be configured to operate similarly as the storage device projected temperature environment configuration subsystem 402 discussed below.

In the illustrated embodiment, the computing device manufacturing system 400 includes a computing device ordering subsystem 404 that is coupled to the storage device projected temperature environment configuration subsystem 402 and that is configured to receive, generate, and/or otherwise include computing device ordering information for computing devices that will be manufactured by the computing device manufacturing system 400. In an embodiment, the computing device ordering subsystem 404 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that computing device ordering subsystem 404 provided in the computing device manufacturing system 400 may include any devices that may be configured to operate similarly as the computing device ordering subsystem 404 discussed below. In the illustrated embodiment, a plurality of customer system(s) 406 are coupled to the computing device ordering subsystem 404 (e.g., via the Internet and/or other networks known in the art) and may be configured to order the computing devices manufactured by the computing device manufacturing system 400.

In the illustrated embodiment, the computing device manufacturing system 400 also includes a plurality of storage devices 408a, 408b, and up to 408c that are illustrated in FIG. 4 as coupled to the storage device projected temperature environment configuration subsystem 402. As discussed below, the storage device projected temperature environment configuration subsystem 402 may be coupled to the plurality of storage devices 408a-408c in order to configure any of the storage devices 408a-408c as discussed below, and in some embodiments the storage device 408a-408c may be coupled directly to the storage device projected temperature environment configuration subsystem 402 and configured as discussed below before being provided in a computing device being manufactured using the computing device manufacturing system 400, while in other embodiments the storage devices 408a-408c may be included in computing devices that are being manufactured using the computing device manufacturing system 400 and that are coupled to the storage device projected temperature environment configuration subsystem 402 to allow the configuration of the storage devices 408a-408c as discussed below.

Furthermore, as discussed below, each of the storage devices 408a-408c may include the same physical hardware configuration (e.g., the same storage processing system 304, the same storage memory system 306, the same storage subsystem 308, etc.), and the storage device projected temperature environment configuration subsystem 402 may configure different subsets of those storage devices 408a-408c (each having the same physical hardware configuration) for respective different projected temperature environments. However, one of skill in the art in possession of the present disclosure will appreciate how the computing device manufacturing system 400 may include storage devices having different physical hardware configurations, as while the benefits of the teachings of the present disclosure may be realized via the different configurations of storage devices having the same physical hardware configuration for respective different projected temperature environments, computing device manufacturing may still require different groups of identical storage devices (e.g., different capacity storage devices) upon which the projected temperature environment configurations are performed (e.g., a group of identical 500 GB storage devices, a group of identical 1 TB storage devices, a group of identical 2 TB storage devices, etc.) However, while a specific computing device manufacturing system 400 has been illustrated and described, one of skill in the art in possession of the present disclosure will recognize that the computing device manufacturing system 400 of the present disclosure may include a variety of components and component configurations while remaining within the scope of the present disclosure as well.

Figure 5:
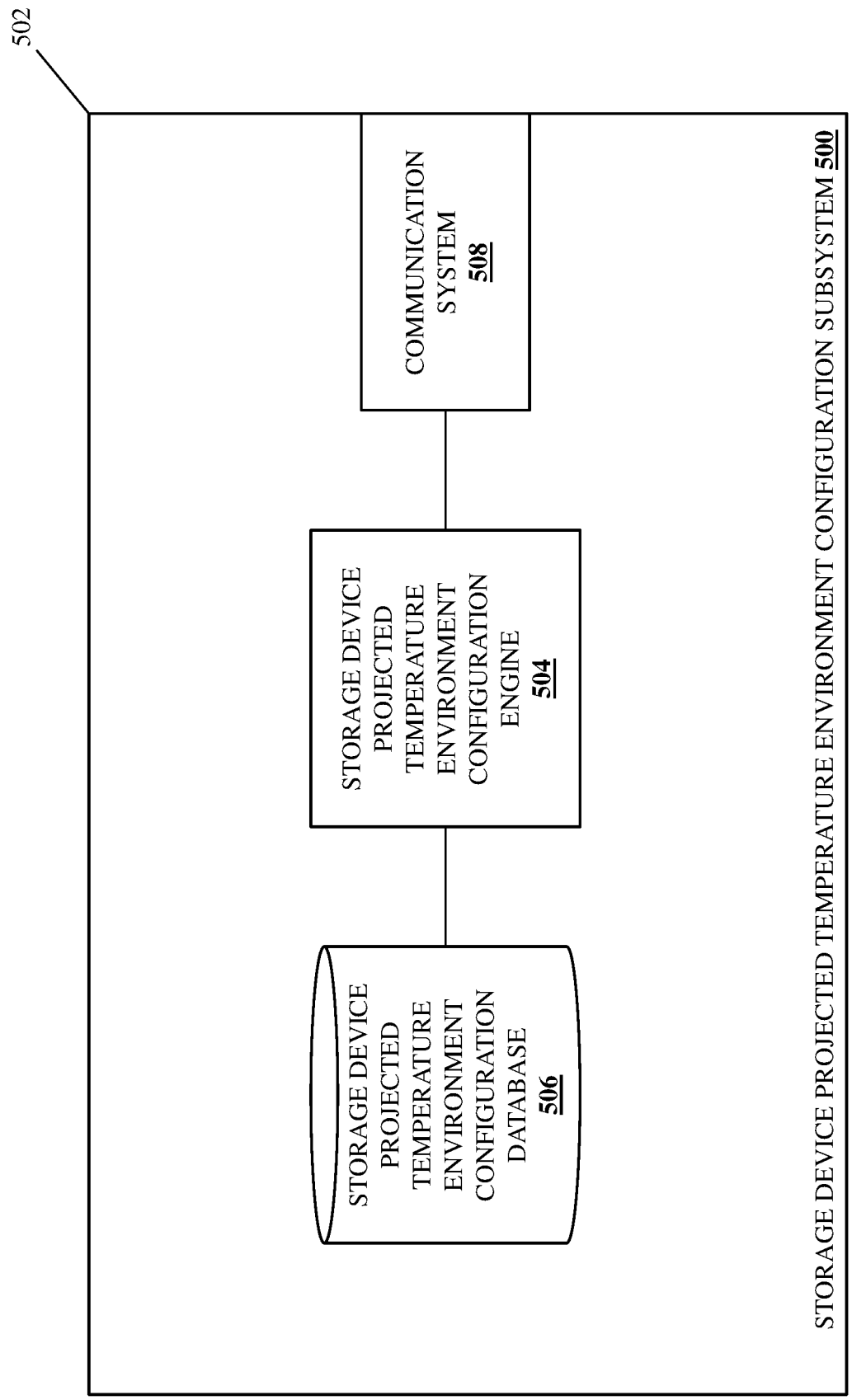
FIG. 5 is a schematic view illustrating an embodiment of a storage device projected temperature environment configuration system that may be included in the computing device manufacturing system of FIG. 4 and that may provide storage devices according to the teachings of the present disclosure.

Referring now to FIG. 5, an embodiment of a storage device projected temperature environment configuration subsystem 500 is illustrated that may provide the storage device projected temperature environment configuration subsystem 402 discussed above with reference to FIG. 4. As such, the storage device projected temperature environment configuration subsystem 500 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the storage device projected temperature environment configuration subsystem 500 discussed below may be provided by other devices that are configured to operate similarly as the storage device projected temperature environment configuration subsystem 500 discussed below. In the illustrated embodiment, the storage device projected temperature environment configuration subsystem 500 includes a chassis 502 that houses the components of the storage device projected temperature environment configuration subsystem 500, only some of which are illustrated and discussed below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage device projected temperature environment configuration engine 504 that is configured to perform the functionality of the storage device projected temperature environment configuration engines and/or storage device projected temperature environment configuration subsystems discussed below.

The chassis 502 may also house a storage system (not illustrated, but which may include the storage 108 discussed above with reference to FIG. 1) that is coupled to the storage device projected temperature environment configuration engine 504 (e.g., via a coupling between the storage system and the processing system) and that includes a storage device projected temperature environment configuration database 506 that is configured to store any of the information utilized by the storage device projected temperature environment configuration engine 504 discussed below. The chassis 502 may also house a communication system 508 that is coupled to the storage device projected temperature environment configuration engine 504 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific storage device projected temperature environment configuration subsystem 500 has been illustrated and described, one of skill in the art in possession of the present disclosure will recognize that storage device projected temperature environment configuration subsystems (or other devices operating according to the teachings of the present disclosure in a manner similar to that described below for the storage device projected temperature environment configuration subsystem 500) may include a variety of components and/or component configurations for providing the functionality discussed below while remaining within the scope of the present disclosure as well.

Figure 6:
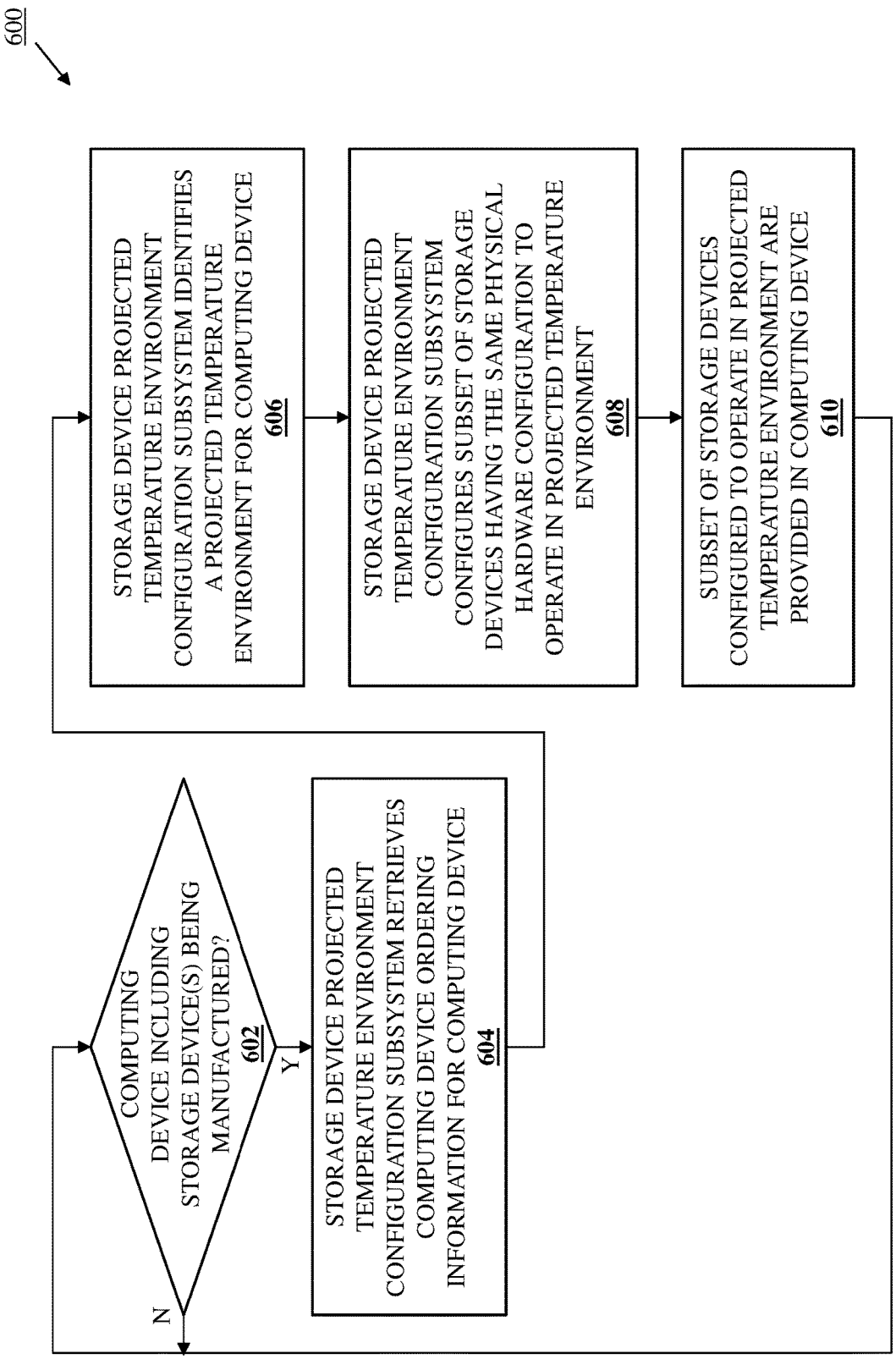
FIG. 6 is a flow chart illustrating an embodiment of a method for configuring a storage device based on a projected temperature environment.

Referring now to FIG. 6, an embodiment of a method 600 for configuring a storage device based on a projected temperature environment is illustrated. As discussed below, the systems and methods of the present disclosure provide for the use of storage devices having the same physical hardware configuration with computing devices that are manufactured for use in different temperature environments by configuring subsets of those storage devices based on the temperature environment of the computing device they will be provided in. For example, the storage device projected temperature environment configuration system of the present disclosure may include storage devices with the same physical hardware configuration, a computing device ordering subsystem, and a computing device manufacturing system that manufactures computing devices with storage device(s) based on computing device ordering information in the computing device ordering subsystem. A storage device projected temperature environment configuration subsystem in the computing device manufacturing system identifies a first projected temperature environment for a first computing device being manufactured by the computing device manufacturing system, configures a first subset of the storage devices to perform first storage operations in the first projected temperature environment, identifies a second projected temperature environment that is for a second computing device being manufactured by the computing device manufacturing system and that is different than the first projected temperature environment, and configures a second subset of the storage devices to perform second storage operations in the second projected temperature environment that are different than the first storage operations. As such, a computing device manufacturing system may stock a single type of storage device (e.g., a plurality of storage devices having the same physical hardware configuration) for use in the manufacture of computing devices that will be used in different temperature environments, while ensuring that those storage devices are optimized for operation in the temperature environment in which they will be used while reducing costs and complexity for the computing device manufacturer.

The method 600 begins at block decision block 602 where the method 600 proceeds depending on whether a computing device including at least one storage device is being manufactured. As described herein, embodiments of the method 600 operate to configure storage devices for use in computing devices being manufactured, and thus will be performed when a computing device is being manufactured that includes storage device(s). However, while the specific example of the configuration of storage devices per the method 600 is described below in response to the ordering/manufacture of a computing device, one of skill in the art in possession of the present disclosure will appreciate how storage devices may be configured based on the teachings of the present disclosure in other situations while remaining within the scope of the present disclosure as well. If, at decision block 602, a computing device is not being manufactured that includes storage device(s), the method 600 returns to decision block 602. As such, the method 600 may loop until a computing device including storage device(s) is being manufactured.

If at decision block 602, a computing device is being manufactured, the method 600 proceeds to block 604 where a storage device projected temperature environment configuration subsystem retrieves computing device ordering information for the computing device. With reference to FIG. 7A, in an embodiment of decision block 602, one or more customer systems 406 in the computing device manufacturing system 400 may perform computing device ordering operations 700 that may include communicating with the computing device ordering subsystem 404 in the computing device manufacturing system 400 or request, order, and/or otherwise define computing device(s) for manufacture by the computing device manufacturing system 400. As will be appreciated by one of skill in the art in possession of the present disclosure, the computing device ordering operations 700 may include any customer system 406 and/or the computing device ordering subsystem 404 identifying, generating, and/or otherwise providing computing device ordering information for a computing device being ordered by the customer system 406 for manufacture by the computing device manufacturing system 400.

For example, the computing device ordering information for any computing device ordered at decision block 602 may identify any components that will be included in that computing device (e.g., processing systems, memory systems, storage systems, networking systems, etc.), any software that will be provided on that computing device, a chassis for the computing device, etc. In addition, the computing device ordering information for any computing device ordered at decision block 602 may identify a projected temperature environment for the computing device. For example, the computing device ordering information may include a "computing device use rating" (e.g., a server rating for a server device) that is associated with a projected temperature environment for the computing device being ordered, with some computing device use ratings associated with a datacenter environment (e.g., 10 C-35 C ambient temperatures), some computing device use ratings associated with a telco/edge environment (e.g., 0 C-55 C ambient temperatures), etc. To provide a specific example, the datacenter environments discussed above may be associated with an American Society of Heating, Refrigerating and Air-conditioning Engineers A2 (ASHRAE A2) computing device use rating, while the telco/edge environments discussed above may be associated with a Generic Requirements 3108 (GR-3108) class 1 computing device use rating defined by the Generic Requirements for Network Equipment in the OutSide Plant (OSP) specification. However, while specific examples have been provided, one of skill in the art in possession of the present disclosure will appreciate how computing device use ratings may identify a projected temperature environment for a computing device in a variety of manners that will fall within the scope of the present disclosure as well.

In other examples, the computing device ordering information may identify the projected temperature environment for the computing device by identifying a user of the computing device (e.g., a telecommunications company), a computing device delivery location (e.g., a location with relatively hot temperatures (e.g., Phoenix, Arizona, United States), a location with relatively cold temperatures (Fairbanks, Alaska, United States), etc.), other computing devices or components that were ordered with the computing device and that are associated with particular projected temperature environments (e.g., relatively high power cooling systems, relatively high power heating systems, etc.), and/or any other computing device ordering information that one of skill in the art in possession of the present disclosure would appreciate as being indicative of a projected temperature environment in which the computing device will be utilized. However, while specific examples, of computing device ordering information have been described above, one of skill in the art in possession of the present disclosure will appreciate how any of a variety of computing device ordering information that may be generated during the ordering of a computing device will fall within the scope of the present disclosure as well.

Figure 7B:
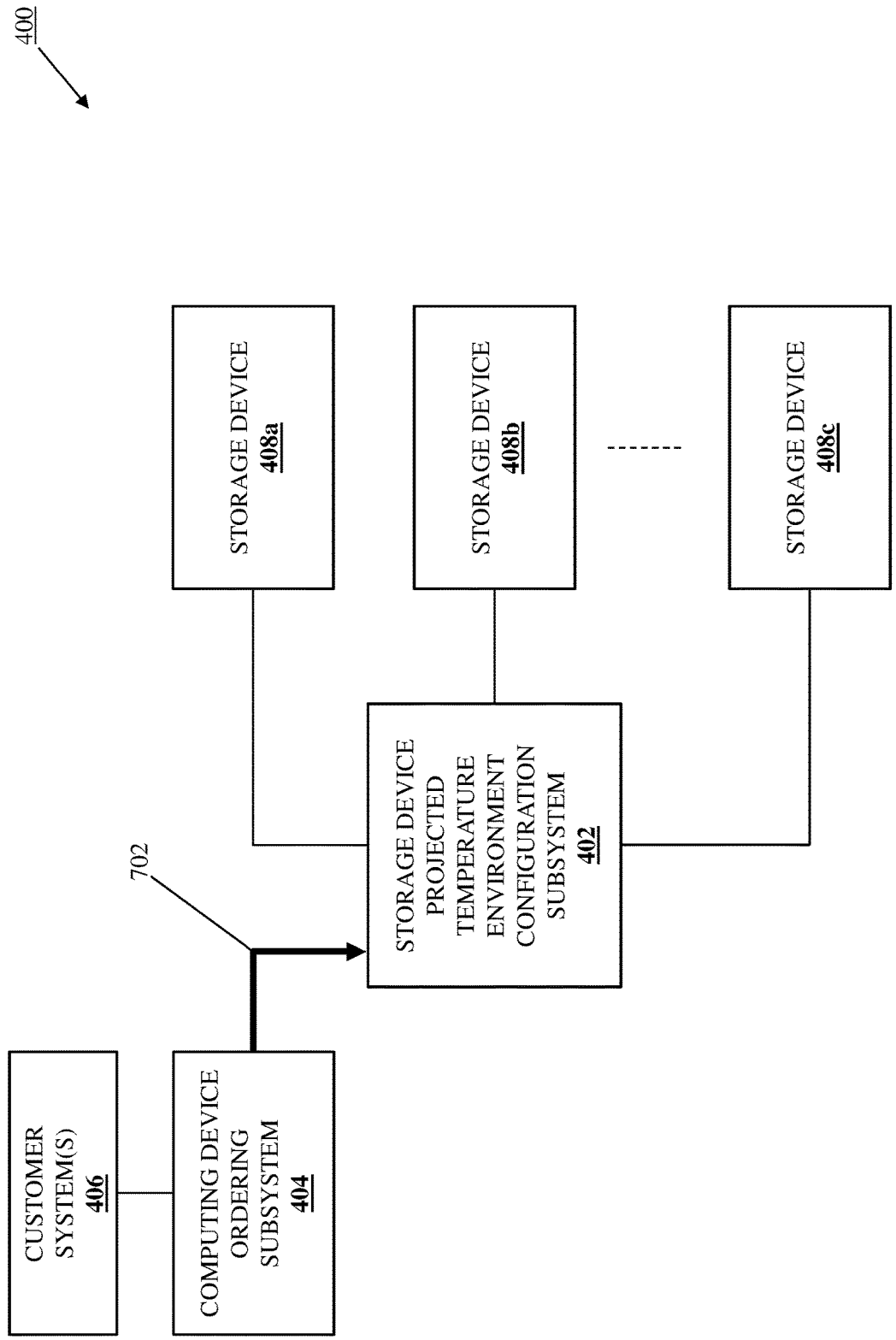
FIG. 7B is a schematic view illustrating an embodiment of the computing device manufacturing system of FIG. 4 operating during the method of FIG. 6.

One of skill in the art in possession of the present disclosure will appreciate how the computing device ordering operations 700 may result in the computing device ordering information being stored in the computing device ordering subsystem 404, and how the storage of the computing device ordering information in the computing device ordering subsystem 404 may indicate that a computing device including storage device(s) is being manufactured such that the method 600 proceeds to block 604. With reference to FIGS. 7B and 7C, in an embodiment of block 604, the storage device projected temperature environment configuration engine 504 in the storage device projected temperature environment configuration subsystem 402/500 may perform computing device ordering information retrieval operations 702 that include retrieving, via its communication system 508, the computing device ordering information for a computing device being manufactured from the computing device ordering subsystem 404. As such, at block 604, the storage device projected temperature environment configuration engine 504 may retrieve the computing device ordering information discussed above that identifies any components that will be included in the computing device being manufactured (e.g., processing systems, memory systems, storage systems, networking systems, etc.), any software that will be provided on the computing device being manufactured, a chassis for the computing device being manufactured, a projected temperature environment for the computing device being manufactured, as well as any other computing device ordering information that would be apparent to one of skill in the art in possession of the present disclosure.

The method 600 then proceeds to block 606 where the storage device projected temperature environment configuration subsystem identifies a projected temperature environment for the computing device. In an embodiment, at block 606, the storage device projected temperature environment configuration engine 504 in the storage device projected temperature environment configuration subsystem 402/500 may perform projected temperature environment identification operations that include identifying a projected temperature environment for the computing device being manufactured. Continuing with some of the specific examples discussed above, the computing device ordering information retrieved at block 604 may include a computing device use rating associated with a projected temperature environment for the computing device being manufactured, with some computing device use ratings associated with a datacenter environment (e.g., an ASHRAE A2 computing device use rating associated with 10 C-35 C ambient temperatures), some computing device use ratings associated with a telco/edge environment (e.g., a GR-3108 class 1 computing device use rating associated with 0 C-55 C ambient temperatures), and/or other computing device use ratings that would be apparent to one of skill in the art in possession of the present disclosure. As such, the projected temperature environment identification operations at block 606 may include identifying the computing device use rating in the computing device ordering information, and determining the projected temperature environment (e.g., the datacenter environment, telco/edge environment, or other temperature environments discussed above) from that computing device use rating.

Continuing with others of the specific examples discussed above, the computing device ordering information may identify the projected temperature environment for the computing device by identifying a user of the computing device (e.g., a telecommunications company), a computing device delivery location (e.g., a location with relatively hot temperatures (e.g., Phoenix, Arizona, United States), a location with relatively cold temperatures (Fairbanks, Alaska, United States), etc.), other computing devices or components that were ordered with the computing device being manufactured and that are associated with particular projected temperature environments (e.g., relatively high power cooling systems, relatively high power heating systems, etc.), and/or any other computing device ordering information that one of skill in the art in possession of the present disclosure would appreciate as being indicative of a projected temperature environment in which the computing device will be utilized. As such, the projected temperature environment identification operations at block 606 may include inferring a projected temperature environment for the computing device being manufactured based on the user of the computing device, the computing device delivery location, other computing devices or components that were ordered with the computing device being manufactured, and/or other computing device ordering information that is indicative of the projected temperature environment in which the computing device will be utilized.

To provide a specific example of the inference of the projected temperature environment for the computing device being manufactured, block 606 may include the storage device projected temperature environment configuration engine 504 in the storage device projected temperature environment configuration subsystem 402/500 determining that the computing device was ordered by a telecommunications company for delivery to Phoenix, Arizona, United States along with relatively high power cooling systems, and thus may infer that the projected temperature environment for the computing device is a telco/edge environment. Furthermore, the inferring of the projected temperature environment for the computing device being manufactured may be supplemented via a determination (e.g., via an Internet search) that the telecommunications company does not have any datacenters in Phoenix, Arizona, United States. However, while a specific example has been provided, one of skill in the art in possession of the present disclosure will appreciate how a variety of computing device ordering information and/or other information may be utilized to identify a projected temperature environment for a computing device while remaining within the scope of the present disclosure.

The method 600 then proceeds to block 608 where the storage device projected temperature environment configuration subsystem configures a subset of storage devices having the same physical hardware configuration to operate in the projected temperature environment. As described above and discussed in further detail below, the computing device manufacturing system 400 may include a plurality of storage devices having the same physical hardware configuration, with the specific example provided below describing a stock of a plurality of 1 TB SSD storage devices.

Furthermore, in some of the specific examples provided below, the plurality of storage devices having the same physical hardware configuration may be provided with a "base" storage device temperature environment configuration that may be changed if the projected temperature environment for the computing device in which they will be provided differs from the temperature environment that the base storage device temperature environment configuration configures those storage devices for. For example, each of the plurality of storage devices having the same physical hardware configuration may be configured with a datacenter environment configuration (e.g., a storage device datacenter environment configuration that corresponds to the ASHRAE A2 computing device use rating for 10 C-35 C ambient temperatures discussed above and that configures the storage device for operation at internal temperatures between 0 C and 70 C) provided by the configuration information 306a discussed above with reference to FIG. 3, and the datacenter environment configuration of any of those storage devices may be changed if that storage device will be provided in a computing device that will be used in a telco/edge environment. However, one of skill in the art in possession of the present disclosure will appreciate that the storage devices having the same physical hardware configuration may be provided with no configurations, and may be configured based on a datacenter environment for the computing device in which they will be provided similarly as discussed below.

As such, in some embodiments of block 608, the storage device projected temperature environment configuration engine 504 in the storage device projected temperature environment configuration subsystem 402/500 may determine that the storage device(s) having the same physical hardware configuration are already configured for the projected temperature environment of the computing device in which they will be provided (e.g., the computing device will be provided in the datacenter environment, and the storage device(s) having the same physical hardware configuration also include a datacenter environment configuration) and, in response, may perform any other configuration operations necessary for the storage device(s) to operate in the computing device being manufactured. As such, this embodiment of the method 600 may proceed to block 610 where the storage device(s) that are configured to operate in the projected temperature environment (e.g., the datacenter environment in this embodiment) are provided in the computing device as part of the manufacture of that computing device, and the method 600 returns to decision block 602.

Figure 7D:
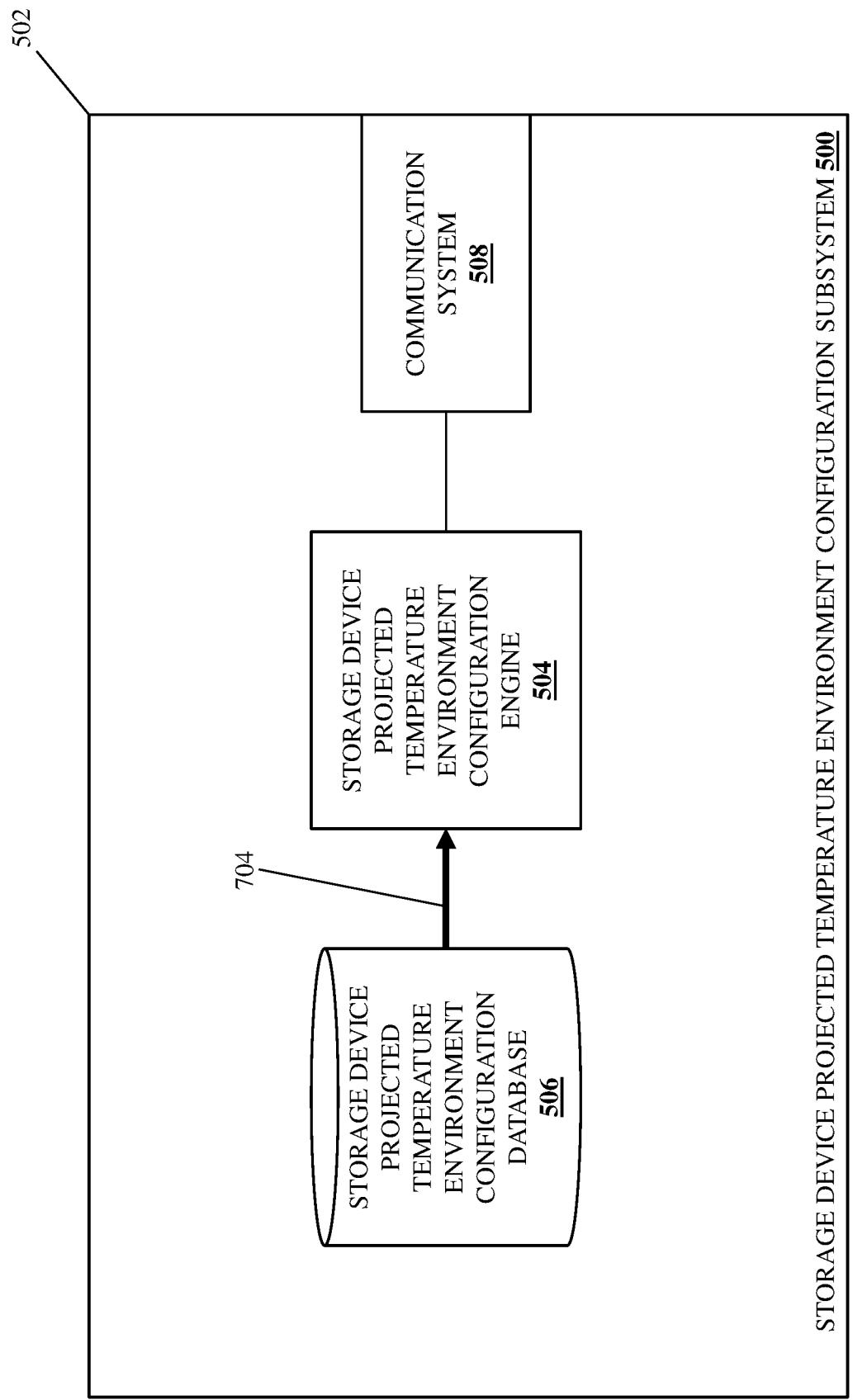
FIG. 7D is a schematic view illustrating an embodiment of the storage device projected temperature environment configuration system of FIG. 5 operating during the method of FIG. 6.

With reference to FIG. 7D, in another embodiment of block 608 and in response to identifying the projected temperature environment for the computing device being manufactured, the storage device projected temperature environment configuration engine 504 in the storage device projected temperature environment configuration subsystem 402/500 may perform storage device projected temperature environment configuration retrieval operations 704 that include retrieving a storage device projected temperature environment configuration corresponding to the projected temperature environment of the computing device in which the storage device(s) will be provided. In one example, the projected temperature environment of the computing device may be the datacenter environment discussed above, and in response to the storage device(s) with the same physical hardware configuration not being configured with the datacenter environment configuration discussed above, the storage device projected temperature environment configuration engine 504 may retrieve the datacenter environment configuration from the storage device projected temperature environment configuration database 506.

In another example, the projected temperature environment of the computing device may be the telco/edge environment discussed above, and in response to the storage device(s) with the same physical hardware configuration not being configured with the telco/edge environment configuration discussed above, the storage device projected temperature environment configuration engine 504 may retrieve the telco/edge environment configuration from the storage device projected temperature environment configuration database 506. However, while two specific temperature environment configurations for storage devices are described, one of skill in the art in possession of the present disclosure will appreciate how other temperature environment configurations may be retrieved while remaining within the scope of the present disclosure as well.

Figure 7F:
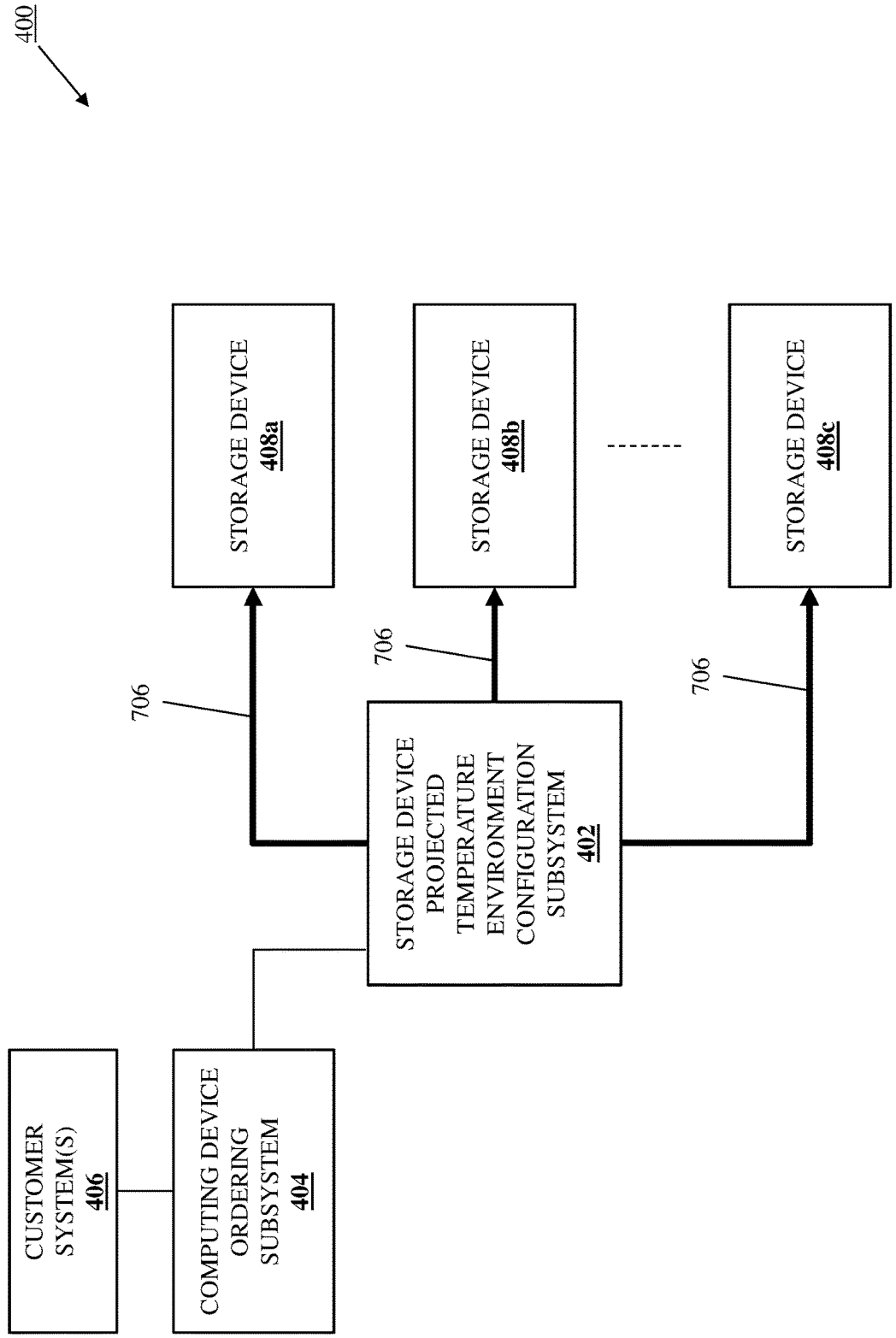
FIG. 7F is a schematic view illustrating an embodiment of the computing device manufacturing system of FIG. 4 operating during the method of FIG. 6.

With reference to FIGS. 7E and 7F, in an embodiment of block 608 and in response to retrieving the storage device projected temperature environment configuration, the storage device projected temperature environment configuration engine 504 in the storage device projected temperature environment configuration subsystem 402/500 may perform storage device projected temperature environment configuration application operations 706 that include applying the storage device projected temperature environment configuration (via its communication system 508) to any of the storage devices 408a-408c that will be provided in the computing device being manufactured. As illustrated in FIG. 7G, in an embodiment of block 608, the application of the storage device projected temperature environment configuration may include providing configuration information 708 for the storage device projected temperature environment configuration in the storage memory system 306, which as discussed above may include replacing/updating the configuration information 306a in the storage memory system 306 discussed above with reference to FIG. 3 with the configuration information 708, providing the configuration information 708 in the storage memory system 306 that is not currently storing configuration information, etc.

In a specific example, the configuration information 708 may be for the datacenter environment configuration discussed above and may be configured to optimize the operation of the storage device 300 for datacenter environments (e.g., datacenter environments corresponding to the ASHRAE A2 computing device use rating for 10 C-35 C ambient temperatures discussed above that require the storage device to perform storage operations at internal temperatures between 0 C and 70 C). For example, the configuration information 708 may include firmware information that is configured for use by the storage processing system 304 to provide firmware for the storage device 300 that is optimized for datacenter environments. As such, the firmware/configuration information 708 may provide firmware for the storage device 300 that provides and/or modifies a program write algorithm used by the storage devices to optimize program/write operations performed by the storage device 300 in the datacenter environment, provides and/or modifies an erase algorithm used by the storage device 300 to optimize erase operations performed by the storage device 300 in the datacenter environment, and provides and/or modifies a read algorithm used by the storage device 300 to optimize read operations performed by the storage device 300 in the datacenter environment.

In another specific example, the configuration information 708 may be for the telco/edge environment configuration discussed above and may be configured to optimize the operation of the storage device 300 for telco/edge environments (e.g., telco/edge environments corresponding to the GR-3108 class 1 computing device use rating associated with 0 C-55 C ambient temperatures discussed above that require the storage device to perform storage operations at internal temperatures between 0 C and 85 C). For example, the configuration information 708 may include firmware information that is configured for use by the storage processing system 304 to provide firmware for the storage device 300 that is optimized for telco/edge environments. As such, the firmware/configuration information 708 may provide firmware for the storage device 300 that provides and/or modifies a program write algorithm used by the storage devices to optimize program/write operations performed by the storage device 300 in the telco/edge environment, provides and/or modifies an erase algorithm used by the storage device 300 to optimize erase operations performed by the storage device 300 in the telco/edge environment, and provides and/or modifies a read algorithm used by the storage device 300 to optimize read operations performed by the storage device 300 in the telco/edge environment.

In a specific embodiment, the optimization of the operation of the storage device 300 may include defining threshold voltages for the storage subsystem 308, and one of skill in the art in possession of the present disclosure will appreciate how threshold voltages that optimize operation of the storage device 300 for datacenter environments will be different than threshold voltages that optimize operation of the storage device 300 for teleco/edge environments. For example, read operation optimization via the provisioning or modification of a read algorithm performed by firmware as discussed above may include shifting NAND cell read threshold voltages to compensate for NAND cell voltage effects at relatively high temperatures, and thus NAND cell read threshold voltages for datacenter environments may differ from NAND cell read threshold voltage for telco/edge environments.

In another specific embodiment, program/write operation optimization via the provisioning or modification of a program/write algorithm performed by firmware as discussed above may include defining a number of voltage pulsing/programming actions that will be utilized in the program/write algorithm to program/write any particular NAND cell. For example, relatively fewer voltage pulses/programming actions to program NAND cells may result in a relatively wider distribution of voltages across NAND cells that may be optimized for datacenter environments due to the relatively lower amount of voltage shift that is experienced at datacenter environment temperature ranges, while relatively more voltage pulses/programming actions to program NAND cells may result in a relatively narrower distribution of voltages across NAND cells that may be optimized for telco/edge environments due to the relatively higher amount of voltage shift that is experienced at telco/edge environment temperature ranges.

In another specific embodiment, erase operation optimization via the provisioning or modification of an erase algorithm performed by firmware as discussed above may include defining a number of voltage pulsing/erase actions that will be utilized in the erase algorithm to erase any particular NAND cell. For example, relatively fewer voltage pulses/erase actions to erase NAND cells may result in a relatively wider distribution of voltages across NAND cells that may be optimized for datacenter environments due to the relatively lower amount of voltage shift that is experienced at datacenter environment temperature ranges, while relatively more voltage pulses/erase actions to erase NAND cells may result in a relatively narrower distribution of voltages across NAND cells that may be optimized for telco/edge environments due to the relatively higher amount of voltage shift that is experienced at telco/edge environment temperature ranges. However, while several specific embodiments have been described for configuration information and/or configurations that may be provided for storage devices based on the projected temperature environment of the computing device in which those storage devices will be provided, one of skill in the art in possession of the present disclosure will appreciate that a variety of configuration information and/or configurations to cause a storage device to operate optimally in a particular projected temperature environment will fall within the scope of the present disclosure as well.

In yet another embodiment, the projected temperature environment may provide a temperature range that is within a temperature range threshold that allows the endurance of the storage device(s) to be extended via the configuration of those storage devices for that projected temperature environment/temperature range. As will be appreciated by one of skill in the art in possession of the present disclosure, different projected temperature environment configurations may each correspond to a respective endurance for the storage device in which they are provided, with the datacenter environment configurations discussed above providing an endurance of 1 write per day (wpd) endurance, the telco/edge environment configurations discussed above providing an endurance of less than 1 write per day (wpd), etc. As such, in embodiments in which the projected temperature environment indicates that the computing device will operate within a relatively tight, non-extreme temperature range (e.g., 15 C-20 C) due to, for example, ambient conditions and/or relatively high-powered cooling systems provided in the computing device or datacenter, the configuration information 708 provided in the storage device 300 may configure the storage device 300 to operate in a manner that increases the endurance of the storage device 300 relative to the endurance of the storage device 300 when configured to operate in the datacenter environment or telco/edge environment. Following the configuration of the storage device(s) to operate in the projected temperature environment at block 608, the storage device(s) may be provided in the computing device being manufactured at block 610, and the method 600 then returns to decision block 602.

Furthermore, while the examples above discuss configuring storage devices with different endurance capabilities in different temperature environments (e.g., 1WPD in datacenter environments vs. less than 1WPD in telco/edge environments), one of skill in the art in possession of the present disclosure will appreciate how other tradeoffs may be made in different temperature environments. For example, the same endurance may be provided in both the datacenter environments and the telco/edge environments discussed above, with the storage devices provided in the telco/edge environments configured with additional overprovisioning that results in a lower capacity than the storage devices provided in the datacenter environments.

Continuing with the specific example provided above, the method 600 may loop such that the computing device manufacturing system 400 may manufacture computing devices using the stock of 1 TB SSD storage devices that have the same physical hardware configuration as discussed above, with computing devices that will be used in datacenter environments having their 1 TB SSD storage devices configured with a datacenter environment configuration that optimizes the operation of those storage devices for 10 C-35 C ambient temperatures experienced by the computing device in which they are provided, computing devices that will be used in telco/edge environments having their 1 TB SSD storage devices configured with a telco/edge environment configuration that optimizes the operation of those storage devices for 0 C-55 C ambient temperatures experienced by the computing device in which they are provided, and computing devices that will be used in other projected temperature environments (e.g., 0 C-100 C) having their 1 TB SSD storage devices configured with other projected temperature environment configurations that optimizes the operation of those storage devices for the other projected temperature environments.

Furthermore, while the examples above describe the configuration of storage devices in a computing device manufacturing system during the manufacture of computing devices, one of skill in the art in possession of the present disclosure will appreciate how the techniques described above may be extended to the reconfiguration of a storage device at a customer location. For example, following the receiving and deployment of a computing device including the storage device(s) discussed above, a customer may move that computing device and/or storage device (e.g., from the datacenter environment to the telco/edge environment, from the telco/edge environment to the datacenter environment, between different datacenter environments, between different telco/edge environments, etc.) and may utilize secure reconfiguration techniques with the computing device manufacturing system (or other storage device reconfigurations systems) based on the teachings above in order to reconfigure the storage device for optimized operation in its new environment.

Thus, systems and methods have been described that provide for the use of storage devices having the same physical hardware configuration with computing devices that are manufactured for use in different temperature environments by configuring subsets of those storage devices based on the temperature environment of the computing device they will be provided in. For example, the storage device projected temperature environment configuration system of the present disclosure may include storage devices with the same physical hardware configuration, a computing device ordering subsystem, and a computing device manufacturing system that manufactures computing devices with storage device(s) based on computing device ordering information in the computing device ordering subsystem. A storage device projected temperature environment configuration subsystem in the computing device manufacturing system identifies a first projected temperature environment for a first computing device being manufactured by the computing device manufacturing system, configures a first subset of the storage devices to perform first storage operations in the first projected temperature environment, identifies a second projected temperature environment that is for a second computing device being manufactured by the computing device manufacturing system and that is different than the first projected temperature environment, and configures a second subset of the storage devices to perform second storage operations in the second projected temperature environment that are different than the first storage operations. As such, a computing device manufacturing system may stock a single type of storage device (e.g., a plurality of storage devices having the same physical hardware configuration) for use in manufacture of computing devices that will be used in different temperature environments, while ensuring that those storage devices are optimized for operation in the temperature environment in which they will be used, and reducing the required inventory/stock of, and other complexity issues associated with, storage devices required for the computing device manufacturing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device projected temperature environment configuration system, comprising:
   a plurality of storage devices that each include the same physical hardware configuration;
   a computing device ordering subsystem;
   a computing device manufacturing system that is configured to manufacture computing devices that includes at least one of the plurality of storage devices based on computing device ordering information included in the computing device ordering subsystem; and
   a storage device projected temperature environment configuration subsystem that is included in the computing device manufacturing system and that is configured to:
      identify, in first computing device ordering information included in the computing device ordering subsystem, a first projected temperature environment for a first computing device being manufactured by the computing device manufacturing system;
      configure at least one first storage device included in the plurality of storage devices to perform first storage device operations in the first projected temperature environment for the first computing device;
      identify, in second computing device ordering information included in the computing device ordering subsystem, a second projected temperature environment for a second computing device being manufactured by the computing device manufacturing system, wherein the second projected temperature environment is different than the first projected temperature environment; and
      configure at least one second storage device included in the plurality of storage devices to perform second storage device operations in the second projected temperature environment for the second computing device that are different than the first storage device operations.

2. The system of claim 1, wherein the storage device projected temperature environment configuration subsystem is configured to:
   identify, in third computing device ordering information included in the computing device ordering subsystem, a third projected temperature environment for a third computing device being manufactured by the computing device manufacturing system, wherein the third projected temperature environment is different than the first projected temperature environment and the second projected temperature environment; and
   configure at least one third storage device included in the plurality of storage device to perform third storage device operations in the third projected temperature environment for the third computing device that are different than the first storage device operations and the second storage device operations.

3. The system of claim 1, wherein the configuring the at least one second storage device to perform the second storage device operations in the second projected temperature environment includes:
   updating first storage device firmware that is included on each at least one second storage device to provide second storage device firmware on each at least one second storage device that is configured to optimize the second storage operations of each at least one second storage device in the second projected temperature environment.

4. The system of claim 3, wherein the configuring the at least one first storage device to perform the first storage device operations in the first projected temperature environment includes:
   determining that first storage device firmware is included on each at least one first storage device and is configured to optimize the first storage device operations of each at least one first storage device in the first projected temperature environment.

5. The system of claim 1, wherein the first projected temperature environment is a datacenter temperature environment, and wherein the second projected temperature environment is a telecommunications/edge environment.

6. The system of claim 1, wherein the configuring the at least one first storage device to perform the first storage device operations in the first projected temperature environment includes:
   modifying a program write algorithm used by the at least one first storage device to optimize program/write operations performed by the at least one first storage device in the first projected temperature environment;
modifying an erase algorithm used by the at least one first storage device to optimize erase operations performed by the at least one first storage device in the first projected temperature environment; and
modifying a read algorithm used by the at least one first storage device to optimize read operations performed by the at least one first storage device in the first projected temperature environment.

7. An Information Handling System (IHS), comprising:
a processing system; and
a memory system that is coupled to the processing system and that includes instructions that, when executed by the processing system, cause the processing system to provide a storage device projected temperature environment configuration engine that is configured to:
identify, in first computing device ordering information included in a computing device ordering subsystem, a first projected temperature environment for a first computing device being manufactured by a computing device manufacturing system;
configure at least one first storage device that is included in a plurality of storage devices having the same physical hardware configuration to perform first storage device operations in the first projected temperature environment for the first computing device;
identify, in second computing device ordering information included in the computing device ordering subsystem, a second projected temperature environment for a second computing device being manufactured by the computing device manufacturing system, wherein the second projected temperature environment is different than the first projected temperature environment; and
configure at least one second storage device included in the plurality of storage devices to perform second storage device operations in the second projected temperature environment for the second computing device that are different than the first storage device operations.

8. The IHS of claim 7, wherein the storage device projected temperature environment configuration engine is configured to:
identify, in third computing device ordering information included in the computing device ordering subsystem, a third projected temperature environment for a third computing device being manufactured by the computing device manufacturing system, wherein the third projected temperature environment is different than the first projected temperature environment and the second projected temperature environment; and
configure at least one third storage device included in the plurality of storage device to perform third storage device operations in the third projected temperature environment for the third computing device that are different than the first storage device operations and the second storage device operations.

9. The IHS of claim 7, wherein the configuring the at least one second storage device to perform the second storage device operations in the second projected temperature environment includes:
updating first storage device firmware that is included on each at least one second storage device to provide second storage device firmware on each at least one second storage device that is configured to optimize the second storage device operations of each at least one second storage device in the second projected temperature environment.

10. The IHS of claim 9, wherein the configuring the at least one first storage device to perform the first storage device operations in the first projected temperature environment includes:
determining that first storage device firmware is included on each at least one first storage device and is configured to optimize the first storage device operations of each at least one first storage device in the first projected temperature environment.

11. The IHS of claim 7, wherein the first projected temperature environment is a datacenter temperature environment, and wherein the second projected temperature environment is a telecommunications/edge environment.

12. The IHS of claim 7, wherein the configuring the at least one first storage device to perform the first storage device operations in the first projected temperature environment includes:
modifying a program write algorithm used by the at least one first storage device to optimize program/write operations performed by the at least one first storage device in the first projected temperature environment;
modifying an erase algorithm used by the at least one first storage device to optimize erase operations performed by the at least one first storage device in the first projected temperature environment; and
modifying a read algorithm used by the at least one first storage device to optimize read operations performed by the at least one first storage device in the first projected temperature environment.

13. The IHS of claim 7, wherein the configuring the at least one first storage device to perform the first storage device operations in the first projected temperature environment includes:
updating, in response to the first projected temperature environment including temperatures within a temperature range threshold, first storage device firmware that is included on each at least one first storage device to provide second storage device firmware on each at least one first storage device that is configured to increase an endurance of each at least one first storage device in the first projected temperature environment.

14. A method for configuring a storage device based on a projected temperature environment, comprising:
identifying, by a storage device projected temperature environment configuration subsystem in first computing device ordering information included in a computing device ordering subsystem, a first projected temperature environment for a first computing device being manufactured by a computing device manufacturing system;
configuring, by the storage device projected temperature environment configuration subsystem, at least one first storage device that is included in a plurality of storage devices having the same physical hardware configuration to perform first storage device operations in the first projected temperature environment for the first computing device;
identifying, by the storage device projected temperature environment configuration subsystem in second computing device ordering information included in the computing device ordering subsystem, a second projected temperature environment for a second computing device being manufactured by the computing device manufacturing system, wherein the second projected temperature environment is different than the first projected temperature environment; and configuring, by the storage device projected temperature environment configuration subsystem, at least one second storage device included in the plurality of storage devices to perform second storage device operations in the second projected temperature environment for the second computing device that are different than the first storage device operations.

15. The method of claim 14, further comprising:

identifying, by the storage device projected temperature environment configuration subsystem in third computing device ordering information included in the computing device ordering subsystem, a third projected temperature environment for a third computing device being manufactured by the computing device manufacturing system, wherein the third projected temperature environment is different than the first projected temperature environment and the second projected temperature environment; and configuring, by the storage device projected temperature environment configuration subsystem, at least one third storage device included in the plurality of storage device to perform third storage device operations in the third projected temperature environment for the third computing device that are different than the first storage device operations and the second storage device operations.

16. The method of claim 14, wherein the configuring the at least one second storage device to perform the second storage device operations in the second projected temperature environment includes:

updating, by the storage device projected temperature environment configuration subsystem, first storage device firmware that is included on each at least one second storage device to provide second storage device firmware on each at least one second storage device that is configured to optimize the second storage device operations of each at least one second storage device in the second projected temperature environment.

17. The method of claim 16, wherein the configuring the at least one first storage device to perform the first storage device operations in the first projected temperature environment includes:

determining, by the storage device projected temperature environment configuration subsystem, that first storage device firmware is included on each at least one first storage device and is configured to optimize the first storage device operations of each at least one first storage device in the first projected temperature environment.

18. The method of claim 14, wherein the first projected temperature environment is a datacenter temperature environment, and wherein the second projected temperature environment is a telecommunications/edge environment.

19. The method of claim 14, wherein the configuring the at least one first storage device to perform the first storage device operations in the first projected temperature environment includes:

modifying, by the storage device projected temperature environment configuration subsystem, a program write algorithm used by the at least one first storage device to optimize program/write operations performed by the at least one first storage device in the first projected temperature environment;

modifying, by the storage device projected temperature environment configuration subsystem, an erase algorithm used by the at least one first storage device to optimize erase operations performed by the at least one first storage device in the first projected temperature environment; and modifying, by the storage device projected temperature environment configuration subsystem, a read algorithm used by the at least one first storage device to optimize read operations performed by the at least one first storage device in the first projected temperature environment.

20. The method of claim 14, wherein the configuring the at least one first storage device to perform the first storage device operations in the first projected temperature environment includes:

updating, by the storage device projected temperature environment configuration subsystem in response to the first projected temperature environment including temperatures within a temperature range threshold, first storage device firmware that is included on each at least one first storage device to provide second storage device firmware on each at least one first storage device that is configured to increase an endurance of each at least one first storage device in the first projected temperature environment.

* * * * *